(12) United States Patent
Vasudeva et al.

(10) Patent No.: US 7,824,137 B2
(45) Date of Patent: Nov. 2, 2010

(54) UNIVERSAL QUICK CONNECT SYSTEM FOR A HOLE SAW

(75) Inventors: Kailash C. Vasudeva, Waterloo (CA); Satnam Singh, Kitchener (CA)

(73) Assignee: Maxtech Consumer Products Limited, Waterloo (CA)

( * ) Notice: Subject to any disclaimer, the term of this patent is extended or adjusted under 35 U.S.C. 154(b) by 0 days.

(21) Appl. No.: 11/435,133

(22) Filed: May 17, 2006

(65) Prior Publication Data

US 2007/0269280 A1 Nov. 22, 2007

(51) Int. Cl.
*B23B 51/05* (2006.01)

(52) U.S. Cl. .................. 408/204; 206/379; 408/240; 408/239 R (58) Field of Classification Search ......... 408/204–209, 408/238, 239 R, 240, 703; 206/379; *B23B 51/04, B23B 51/05*
See application file for complete search history.

(56) References Cited

U.S. PATENT DOCUMENTS

| | | | | |
|---|---|---|---|---|
| 400,287 | A * | 3/1889 | Bartlett | 206/379 |
| 434,780 | A * | 8/1890 | Hescox | 206/379 |
| 3,825,362 | A * | 7/1974 | Hougen | 408/68 |
| 4,199,060 | A * | 4/1980 | Howard | 206/231 |
| 5,171,111 | A | 12/1992 | Kishimoto | |
| 5,525,314 | A * | 6/1996 | Hurson | 422/300 |
| 5,624,213 | A | 4/1997 | Anderson | 408/206 |
| 5,641,066 | A | 6/1997 | Mascaro | 206/372 |
| 5,813,802 | A * | 9/1998 | Ajimi et al. | 408/68 |
| 6,120,221 | A | 9/2000 | Alm | |
| 6,623,220 | B2 | 9/2003 | Nuss et al. | |
| 7,066,329 | B2 * | 6/2006 | Riley | 206/443 |
| 7,073,992 | B2 * | 7/2006 | Korb et al. | 408/204 |
| 7,097,397 | B2 * | 8/2006 | Keightley | 408/204 |
| 7,101,124 | B2 * | 9/2006 | Keightley | 408/204 |
| 7,104,738 | B2 | 9/2006 | Cantlon | |
| 7,112,016 | B2 | 9/2006 | Nordlin | |
| 7,165,674 | B2 * | 1/2007 | Pangerc et al. | 206/379 |
| 7,275,659 | B2 * | 10/2007 | Openiano | 221/268 |
| 2002/0122703 | A1 | 9/2002 | Czyzewski et al. | |
| 2004/0144671 | A1 | 7/2004 | Hallee et al. | |
| 2004/0179911 | A1 * | 9/2004 | Keightlev | 408/204 |
| 2004/0247405 | A1 | 12/2004 | Keightley | |
| 2005/0042048 | A1 | 2/2005 | Keightley | |
| 2006/0226042 | A1 * | 10/2006 | Seymour et al. | 206/379 |

FOREIGN PATENT DOCUMENTS

| | | | |
|---|---|---|---|
| CA | 2356808 | B2 | 9/2006 |
| DE | 20113578 | U1 * | 10/2001 |
| JP | 10006112 | A * | 1/1998 |
| JP | 2002355712 | A * | 12/2002 |
| JP | 2004034210 | A * | 2/2004 |
| WO | WO 2004082875 | A1 * | 9/2004 |

\* cited by examiner

*Primary Examiner*—Daniel W Howell
(74) *Attorney, Agent, or Firm*—Borden Ladner Gervais LLP; Jeffrey W. Wong (57) ABSTRACT

The invention is directed at a quick connect mechanism for mounting a hole saw to a tool comprising a hole saw; a mandrel having a first end for mounting to the hole saw and a second end for mounting to the tool; and a drill bit, assembled within the mandrel such that when the mandrel is connected to the hole saw, the drill bit being concentrically centered within the hole saw; a holder, mounted to the tool, for receiving the second end of the mandrel; wherein the second end of the mandrel includes quick connect means for easily mounting the mandrel to and releasing the mandrel from the holder.

17 Claims, 11 Drawing Sheets

UNIVERSAL QUICK CONNECT SYSTEM FOR A HOLE SAW

FIELD OF THE INVENTION

The present invention relates generally to tools. More particularly, the present invention relates to a universal quick connect system for a hole saw.

BACKGROUND OF THE INVENTION

Hole saws are well known in the art and are generally used to assist a user in cutting a hole in a construction material such as wood or metal. In general, two types of hole saws are known. One is known as a carbon hole saw which is formed of carbon steel and generally used to cut a hole in a softer construction material such as wood. The other type of hole saw is known as a bi-metal hole saw which is generally manufactured as a combination of a carbon steel body and high speed steel teeth and used to cut a hole in a construction material such as metal.

Hole saws are connected to a drill via a hole saw mounting apparatus with many variations in construction ranging from rudimentary mechanisms well known in the art to more recent mechanisms newer in the art.

With some conventional hole saws, the hole saw, mandrel and drill bit are manufactured and assembled as a complete system. When a user wishes to cut a hole using this type of conventional hole saw, the user simply mounts the system on to the drill and proceeds to cut their hole. When the user wishes to cut another sized hole, the user is then required to disengage the entire hole saw system from the drill and then replace it with another hole saw on, and re-engage the entire hole saw system. This is quite time consuming and may contribute to the delay of the completion of a project.

Figure 1:
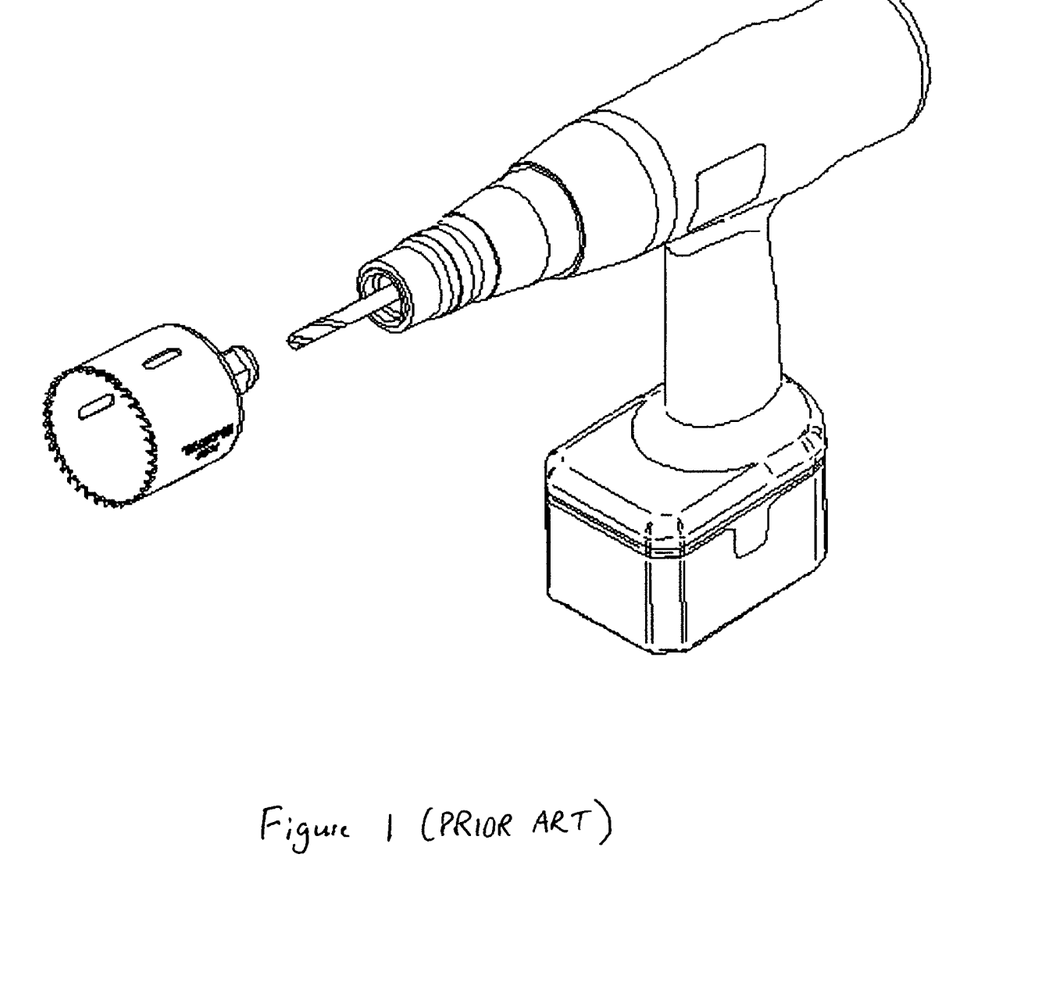
FIG. 1 is a perspective view of a prior art hole saw and hole saw adapter system.

In some other conventional hole saws, the hole saws include quick connect means so that the hole saw may be quickly disengaged from the drill after use. However, in these hole saws, quick connect means, although quicker than previously mentioned hole saws have shortcomings to their quickness. For example, one hole saw with such quick connect mean includes the drill bit mounted directly into the quick connect means thereby requiring the user to initially install the drill bit into the quick connect means, align the drill bit through the mandrel and into the hole saw and locking with the quick connect in preparation for use. This requires steps that are time consuming and require particular visual alignment. Furthermore, the assemble results in a drill bit with more than desired play to pilot the hole saw cutting operation. An example of such a system is schematically shown in FIG. 1.

It is, therefore, desirable to provide a universal quick connect system for a hole saw which overcomes the disadvantages of the prior art.

SUMMARY OF THE INVENTION

It is an object of the present invention to obviate or mitigate at least one disadvantage of previous hole saw mounting apparatus.

In a first aspect of the invention, there is provided a quick connect mechanism for mounting a hole saw to a tool comprising a hole saw; a mandrel having a first end for mounting to the hole saw and a second end for mounting to the tool; and a drill bit, assembled within the mandrel such that when the mandrel is connected to the hole saw, the drill bit being concentrically centred within the hole saw; a holder, mounted to the tool, for receiving the second end of the mandrel; wherein the second end of the mandrel includes quick connect means for easily mounting the mandrel to and releasing the mandrel from the holder.

In another aspect of the invention., there is provided a quick connect system for mounting a hole saw to a tool comprising a housing including a plurality of docking stations for housing multiple hole saw and mandrel combinations; the hole saw and mandrel combinations including a hole saw; a mandrel having a first end for mounting to the hole saw and a second end for mounting to the tool; and a drill bit, assembled within the mandrel such that when the mandrel is connected to the hole saw, the drill bit being concentrically centred within the hole saw; and a holder, mounted to the tool, for receiving the second end of the mandrel wherein the second end of the mandrel includes quick connect means for easily mounting the mandrel to and releasing the mandrel from the holder.

As is understood, the manufacture of hole saws are guided by industry standards so that a universal quick connect system may be of great advantage in the field of hole saws. By providing a universal quick connect system, a user is able to select mate any conventional hole saw with any tool without having to rely on unique hole saw apparatus for specific holes saws and tools.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 5b is a view taken along line 5b-5b of FIG. 5a;

FIG. 6c is an exploded view of the embodiment of FIG. 6a;

DETAILED DESCRIPTION

Generally, the present invention provides apparatus for a universal quick connect system for a hole saw.

Figure 2:
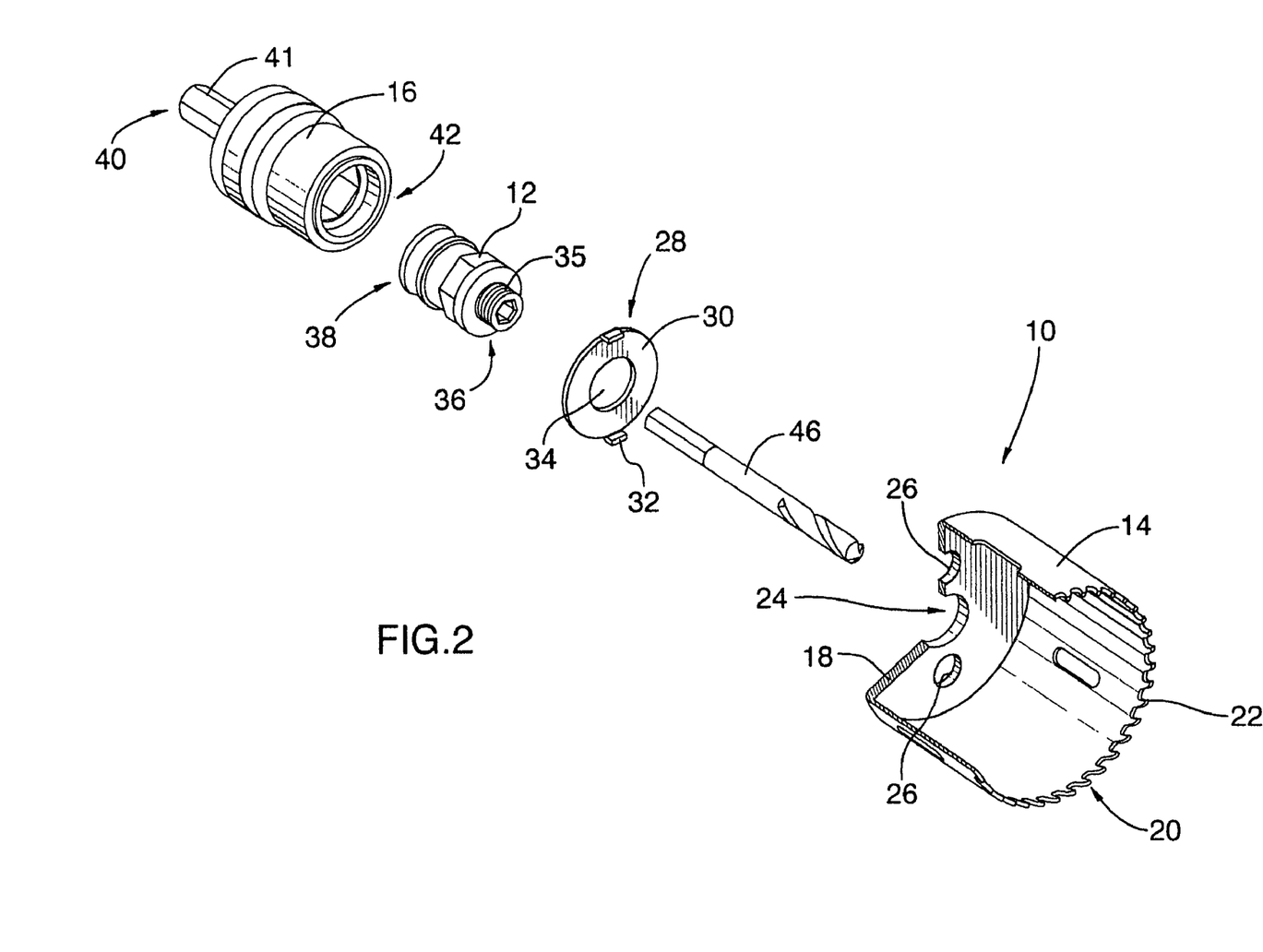
FIG. 2 is a perspective view of a universal quick connect system for a hole saw.

Turning to FIG. 2, a perspective exploded view of a universal quick connect system for use with a bi-metal hole saw is shown. The universal quick connect system 10 comprises a mandrel 12 (which is connected to a (partially cut away) hole saw 14) and a holder 16. The hole saw 14 includes a base end 18 for receiving the mandrel 12 and a cuffing end 20 which comprises a set of cutting teeth 22. As shown, the base end 18 of the hole saw 14 comprises a central hole 24 for receiving the mandrel 12 and a pair of radially opposed holes 26 adjacent the central hole 24. The central hole 24 generally includes threaded means for mating with the mandrel 12 although other methods of mating the mandrel 12 with the hole saw 14 are contemplated.

The mandrel 12 comprises a hole saw end 36 which is mounted to the hole saw 14. The hole saw end 36 preferably comprises the threaded portion 35 which is complementary to threaded means (not shown) in the central hole 24 of the hole saw 14. The mandrel also comprises a holder end 38 which mates with the holder 16.

Figure 5A:
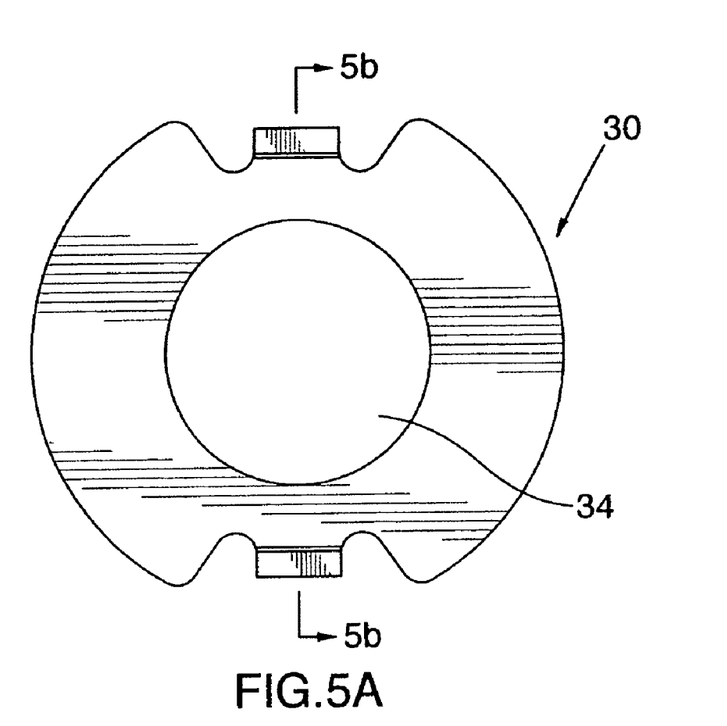
FIG. 5a is a front view of a saw plate.
Figure 5B:
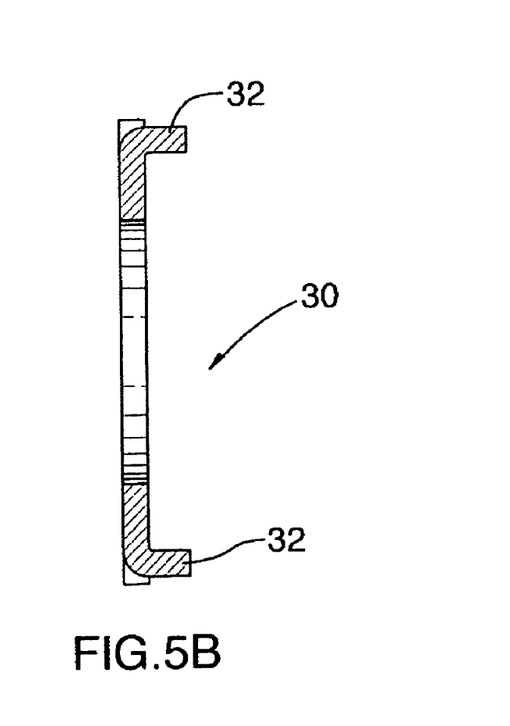

The universal quick connect system 10 preferably comprises a plate 28, such as a saw plate or a washer located around the mandrel 12 and the base end 18 of the hole saw 14. In this embodiment, the plate 28 is a saw plate 30 including tangs 32 which are used to assist in driving the hole saw 14 by providing a further driving force as the hole saw is cutting a hole. The plate 28 may also serve to provide a means to prevent the holder 16 from disengaging from the mandrel 12 while the hole saw 14 is in operation. The saw plate 30 includes a hole 34, allowing a threaded portion 35 of the mandrel 12 to pass therethrough to mate with the hole saw so that the plate 30 abuts the hole saw 14 around while located around the mandrel 12. In order to mount the saw plate 30 to the hole saw 14, the tangs 32 of the plate 30 are inserted into the radially opposed holes 26, or notches on the surface of the hole saw depending on the size of the hole saw. The saw plate 30 is more clearly shown in FIGS. 5a and 5b.

The holder 16 comprises a tool end 40 which comprises means 41 for connecting the holder 16 to a tool (such as a drill) and a mandrel end 42 for receiving the mandrel 12. Different types of tool end connecting means 41 will be well known to one skilled in that art. In the present embodiment, the connecting means 41 of the tool end 40 is easily inserted and locked into the mouth of the tool. In operation, the tool provides the necessary rotational power for a hole to be cut by the hole saw 14. The mandrel end 42 include means for quickly connecting and releasing the holder to and from the mandrel 12. Various quick connect means will be well understood by one skilled in the art.

In order to create an initial hole to assist the hole saw 14 in the cutting the hole, a drill bit 46 is inserted through a central bore 44 (as more clearly shown in FIG. 4) of the mandrel 12 and is locked in place when the holder 16 is connected to the mandrel 12. The drill bit 46 forms a part of the universal quick connect system 10. The connection between the holder 16, mandrel 12 and the drill bit 46 will be described herein below.

Figure 3A:
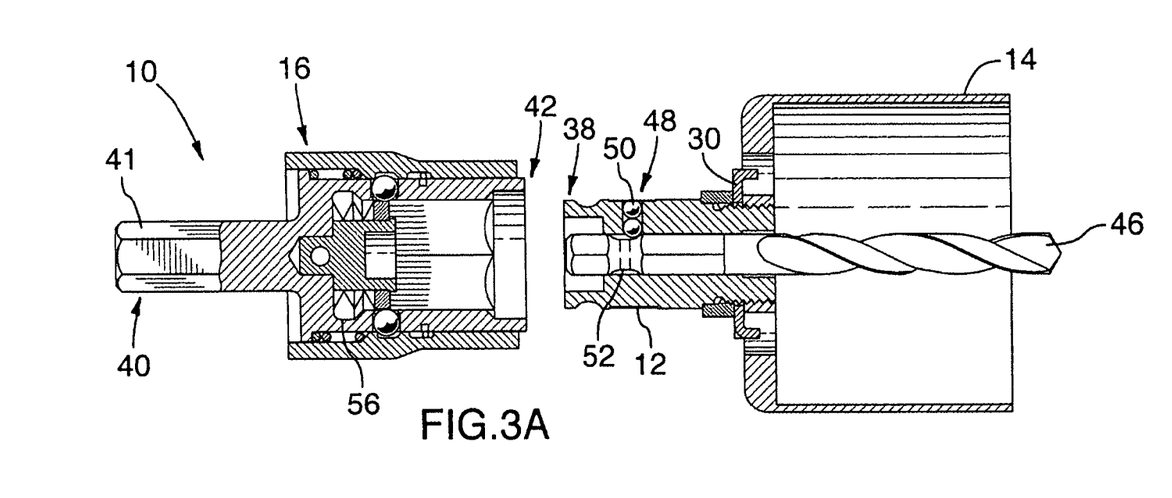
FIG. 3a is a cut away view of a first embodiment of a universal quick connect system in a release position.
Figure 3B:
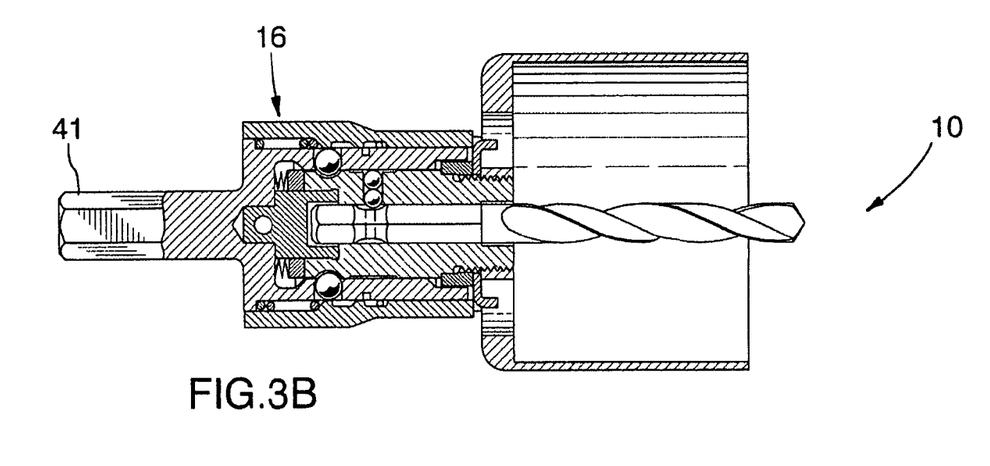
FIG. 3b is a cut away view of the embodiment of FIG. 3a in a locked position.

FIG. 3a is a cut-away view of the universal quick connect system in a released position while FIG. 3b is a cut-away view of the universal quick connect system in a locked position.

The tangs 32 of the saw plate 30 are inserted into the radially opposed holes 26 of the hole saw 14 and the mandrel 12 mounted to the hole saw 14 and the drill bit 46 is inserted into the central bore 44 of the mandrel 12. In order to locate the drill bit 46 within the mandrel 12 (prior to being locked by the holder), the mandrel 12 includes a drill bit locating means 48, seen in the present embodiment as a pair of steel balls 50 which mate with a small groove, or indent, 52 in the drill bit 46. The holder 16 is then quickly connected to the mandrel 12 by inserting the mandrel into the holder 16 which locks the drill bit 46 and mandrel 12 in place for operation. Although the holder may be inserted into the mouth of the tool after receiving the mandrel 12, the holder 16 is preferably attached to the tool, prior to receiving the mandrel, so that when after the holder 16 is quickly connected to the mandrel 12, the hole saw 14 is ready for immediate use (with the provision of power).

The central bore 44 for the mandrel 12 is preferably manufactured by known means and finished by broaching which allows a tighter fit to be provided between the drill bit 46 and the mandrel 12 so that there is little movement of the drill bit 46 during operation.

As will be understood, by having the drill bit 46 form a part of the quick connect system, the drill bit 46 is centred within the entire system which allows the hole saw to be more quickly and easily connected to the tool.

The quick connect means for connecting the holder 16 and the mandrel 12 are generally conventional and it will be understood that there are numerous means for providing quick connect means between the holder and the mandrel. However, unlike some conventional quick connect means, the mandrel 12 also comprises means for locating and supporting 54 from the holder when the holder and the mandrel are connected. The holder 16 also comprises complementary housing 56 for receiving one of the means for locating and supporting 54 the mandrel.

Figure 4:
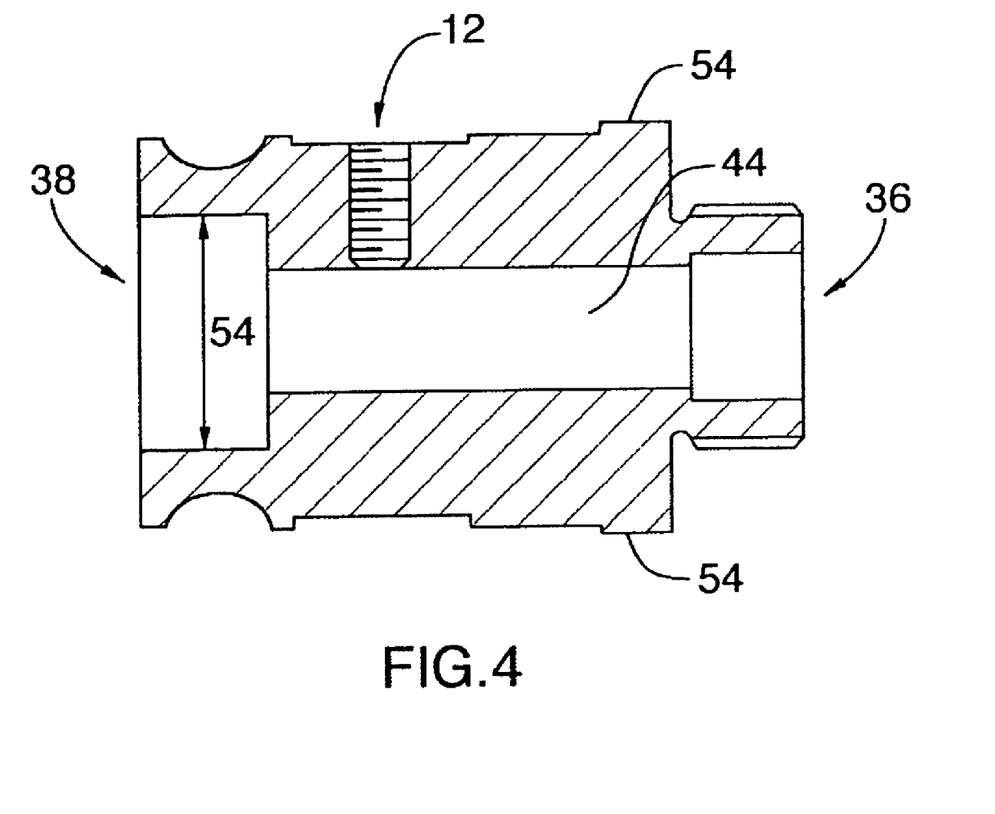
FIG. 4 is a cut away view of a mandrel.

As more clearly shown in FIG. 4, one of the means for locating and supporting 54 is located at the hole saw end 36 of the mandrel 12 while a second means for locating and supporting 54 is located at the holder end 38. The locating and supporting means 54 provide further support to the quick connect system 10 so that there is little movement of the hole saw during operation and to improve the accuracy of concentricity of the holder 16 (and therefore the hole saw 14) when the hole saw is in use. If play exists in the pilot bit, the hole drilled by the hole saw is inaccurate thereby causing the hole saw to be less accurate. By reducing or eliminating play in the drill bit, the hole saw experiences improved accuracy.

Figure 6A:
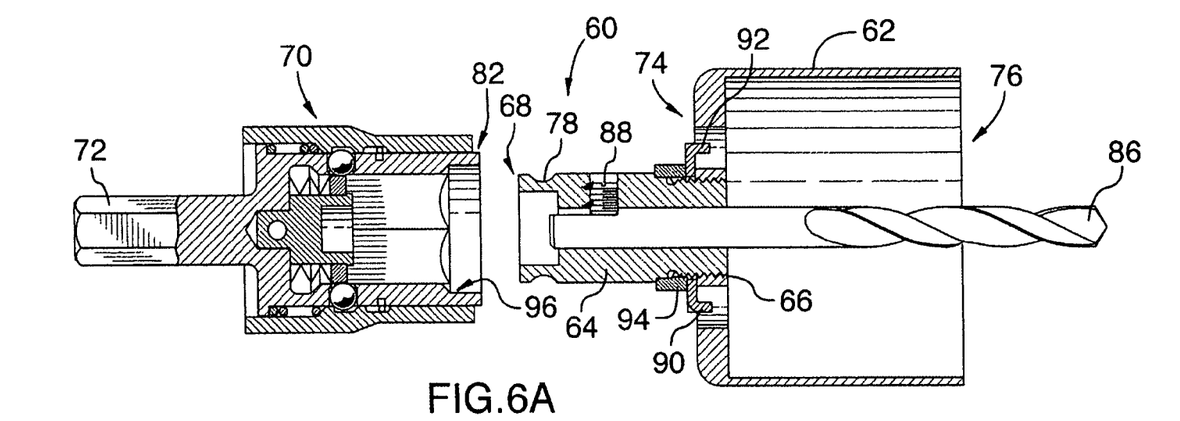
FIG. 6a is a cut away view of a second embodiment of a universal quick connect system in a release position.
Figure 6B:
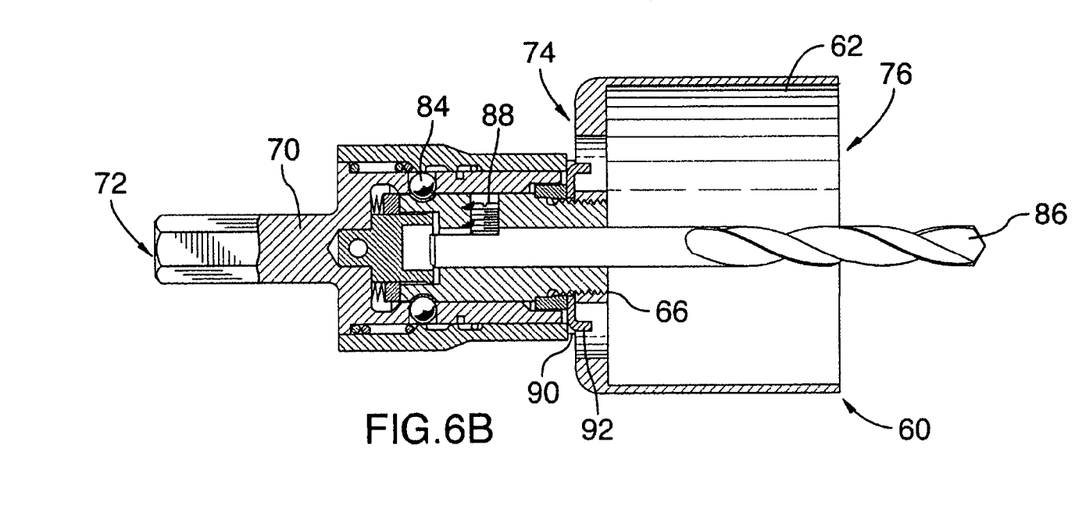
FIG. 6b is a cut away view of the embodiment of FIG. 6a in a locked position.
Figure 6C:
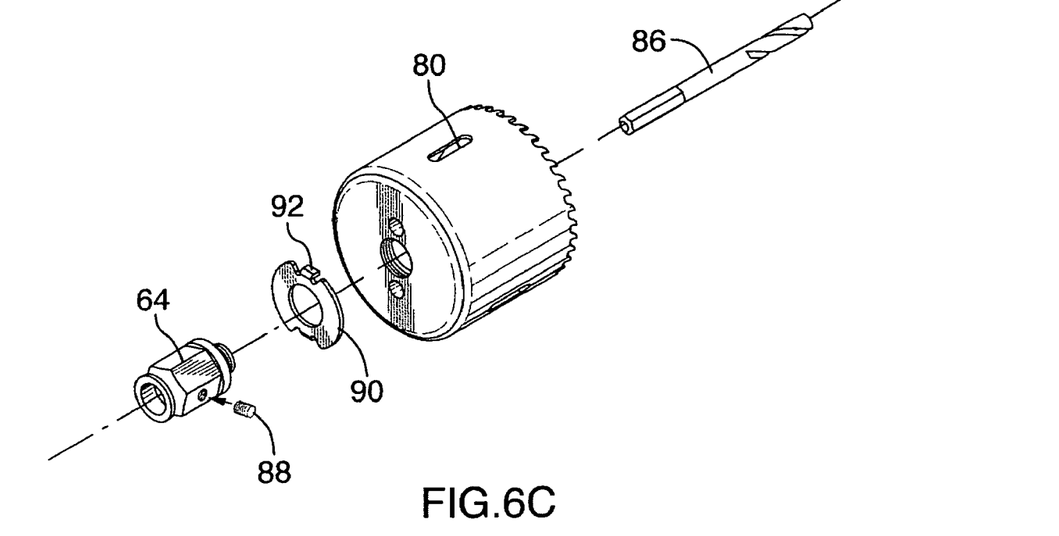

Turning to FIGS. 6a to 6c, various views of an embodiment of a universal quick connect apparatus for mounting a hole saw to a tool, such as a drill, is shown. The quick connect apparatus 60 comprises a hole saw 62, a mandrel 64 having a first, preferably threaded, end 66 for mating with the hole saw 62 and a second end 68 for mating with a holder 70. The holder 70 includes means for mounting 72 the holder to the tool. In this embodiment, the means for mounting is a hex-shaped shaft which is shaped to fit in a standard tool, or drill.

The first end 66 of the mandrel 64 mates with complementary threading in a hole in the base end 74 of the hole saw 62. A cutting end 76 of the hole saw 62 includes a set of teeth (not shown) for cutting the hole. The second end 68 of the mandrel 64 includes a groove or detent 78.

The hole saw 62 preferably includes at least one slot 80 allowing a user to access the inside of the hole saw to remove a slug (the material remaining after a hole has been cut) without having to remove the hole saw.

The holder 70 includes a mandrel receiving end 82 for receiving the second end 68 of the mandrel 64. The mandrel 64 and the holder 70 include complementary quick connect means so that the quick connect apparatus 60 (such as the hole saw and mandrel) may be easily and quickly removed from the drill when necessary. Various types of quick connect means are known and are contemplated for providing the mating between the mandrel 64 and the holder 70. In the present embodiment, the holder includes a set of balls 84 which mate with the groove 78 of the second end 68 to lock the mandrel 64 in place so that the hole saw 62 is connected to the drill.

The mandrel 64 includes a central bore, allowing for a drill, or pilot, bit, 86 to be inserted therethrough and be concentrically spaced within the mandrel 64. In this embodiment, the drill bit 86 is locked in place by a set screw 88 which is manually rotated into place by a user. This allows the drill bit 86 to be easily replaced when necessary. The use of the set screw reduces or eliminates the amount of play experienced by the drill bit 86 when the hole saw 62 is in use since the drill bit 86 is preassembled and centred within the mandrel prior to being mounted to the drill. When the mandrel 64 is mounted to the hole saw 62, the drill bit 86 protrudes through the hole saw 62 and is also concentrically located within the hole saw 62. By including the drill bit 86 as part of the quick connect system, there is less time required to mount the hole saw 62 to the tool and the drill bit is pre-centred within the overall system rather than requiring the user to centre the drill bit within the quick connect system as described above with respect to FIG. 1.

A plate 90 is preferably located between the mandrel 64 and the hole saw 62, the plate 90 having a pair of tangs 92 for mating with holes in the hole saw 62. As described above, the plate 90 is used to provide further assistance in driving the hole saw 62 during operation and to assist in preventing accidental disengagement between the holder 70 and the mandrel 64 when the hole saw is in use. Depending on the size of the hole saw 62, the plate 90 may either be a washer or a saw plate as discussed in more detail below with respect to FIGS. 7 and 8. The diameter of the plate 90 is preferably larger than the diameter of the hole saw 62 to reduce the likelihood of the holder 70 becoming inadvertently disconnected/disengaged from the quick connect apparatus 60 during operation. This is more clearly shown in FIG. 7a. As the hole is being cut by the hole saw, the plate 90 prevents the mandrel from entering the hole thereby reducing or eliminating the chance that the mandrel and holder being disengaged during use.

A locating ring 94 is mounted around the mandrel 64 to assist in locating the holder 70 when it is connected. The locating ring 94 preferably rests within a complementary housing 96 in the mandrel receiving end 82 of the holder 70.

One advantage of the current quick connect system is that, unlike hole saw connectors in the prior art, the drill bit 86 is preassembled to the mandrel 64 and forms part of the quick connect apparatus 60. This allows a user to quickly connect the holder 70 to the mandrel without having to worry about centring the drill bit within the mandrel. There is no need to firstly insert a drill bit into the drill before carefully centring the drill bit within the hole saw apparatus.

Figure 7:
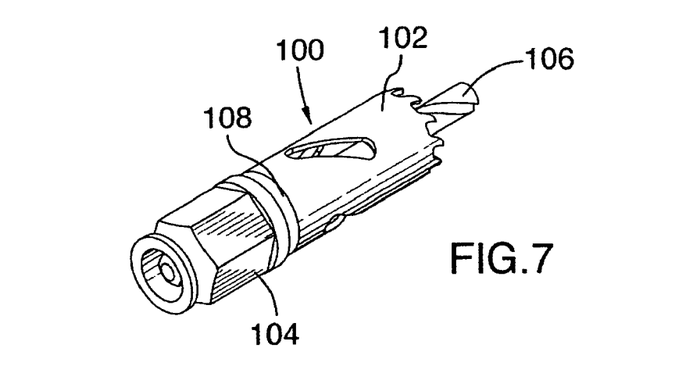
FIG. 7 is a perspective view of another embodiment of a hole saw and mandrel portion of a universal quick connect system.
Figure 7A:
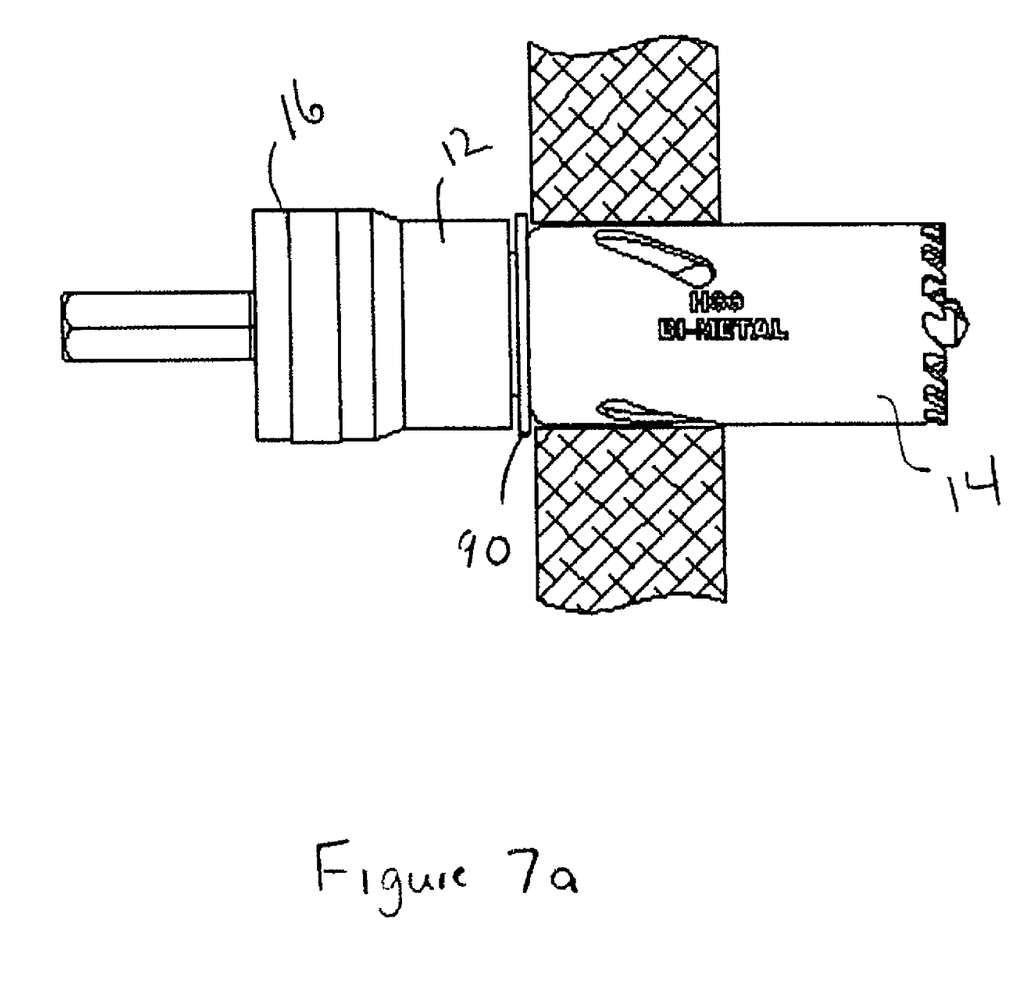
FIG. 7a is a side view of the embodiment of FIG. 7 in use.
Figure 8:
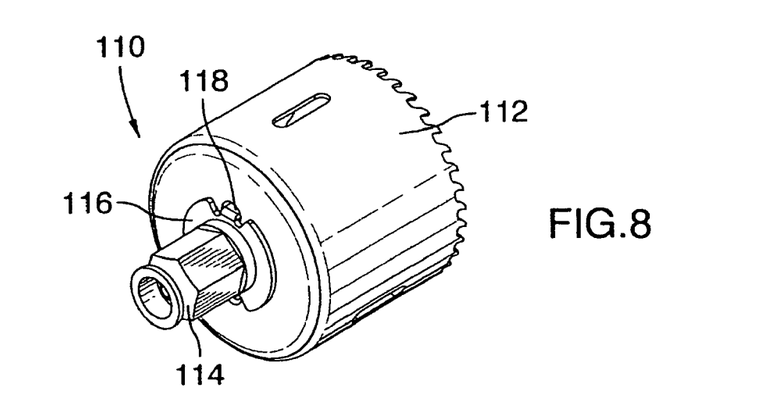
FIG. 8 is a perspective view of yet a further embodiment of a hole saw and mandrel portion of a universal quick connect system.

Turning to FIGS. 7 and 8, further embodiments of a mandrel and hole saw combination are shown. In FIG. 7, the hole saw and mandrel combination 100 comprises a small diametered hole saw 102 and a mandrel 104. A drill bit 106 is also preassembled to the mandrel 104 and preferably locked in place by a set screw (not shown). In this small diametered hole saw embodiment, the plate 108 is a washer. In this embodiment, the washer 108 simply serves as further assistance in preventing the disengagement between the holder and the mandrel during use. However, it will be understood that the plate 108 may include tangs if so desired.

In FIG. 8, the hole saw and mandrel combination 110 comprises a large diametered hole saw 112 and a mandrel 114. Although not shown, a drill bit is preassembled to the mandrel. Due to the diameter of the hole saw, a saw plate 116 having a pair of tangs 118 in order to provide a further torque to the hole saw when in use. As indicated above, a flat washer or a bevelled washer or the like may also be used if the extra drive force is not required.

Figure 9:
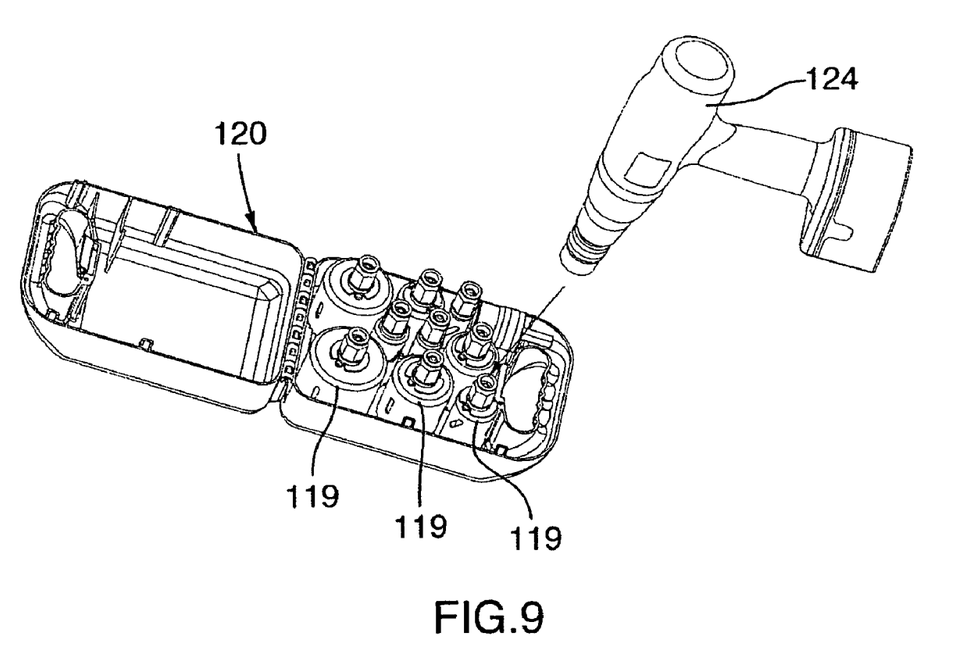
FIG. 9 is a perspective view of a plurality of hole saw and mandrel portions stored in a docking station.
Figure 10:
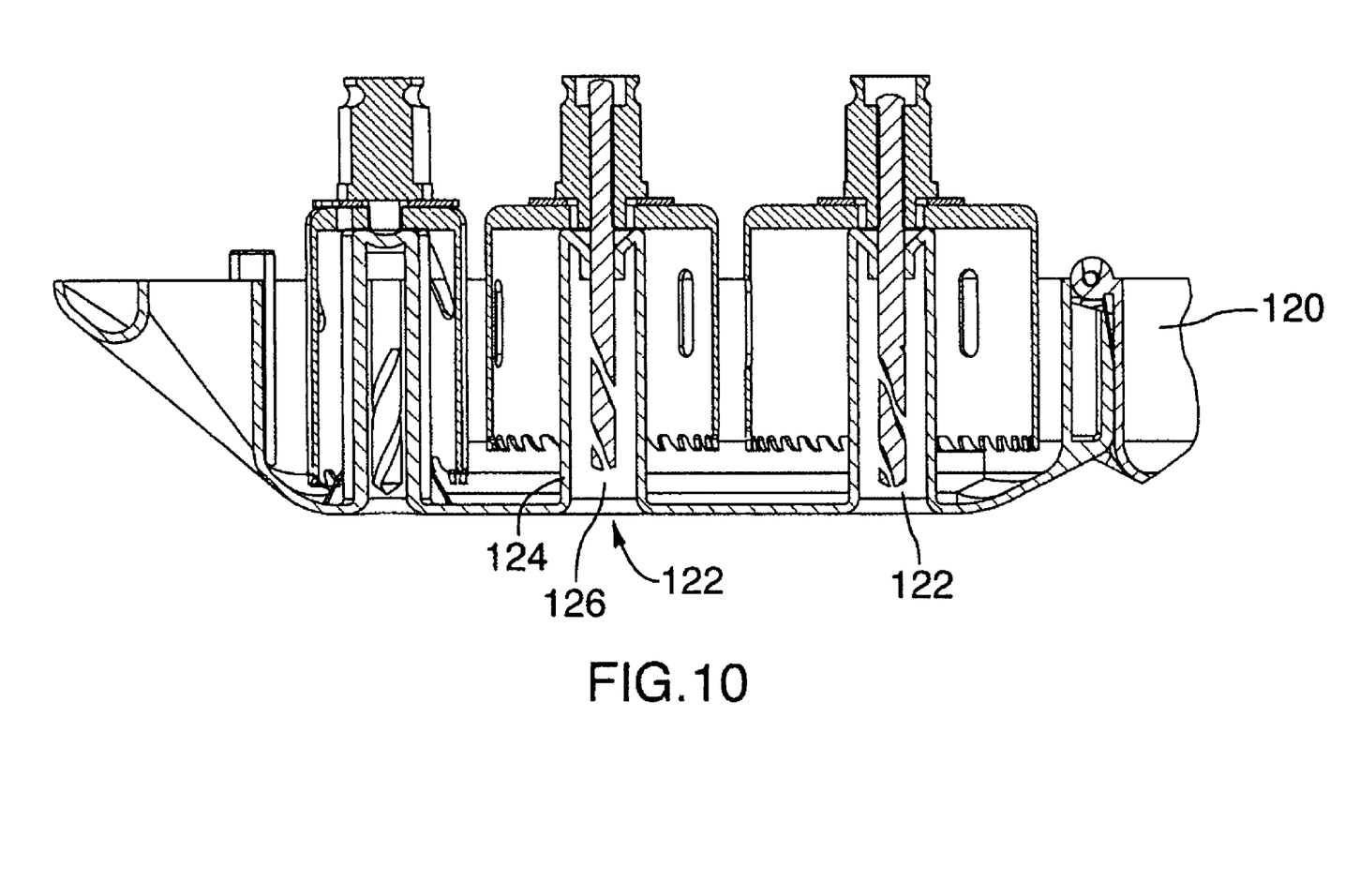
FIG. 10 is a cut away side view of the docking station.
Figure 11:
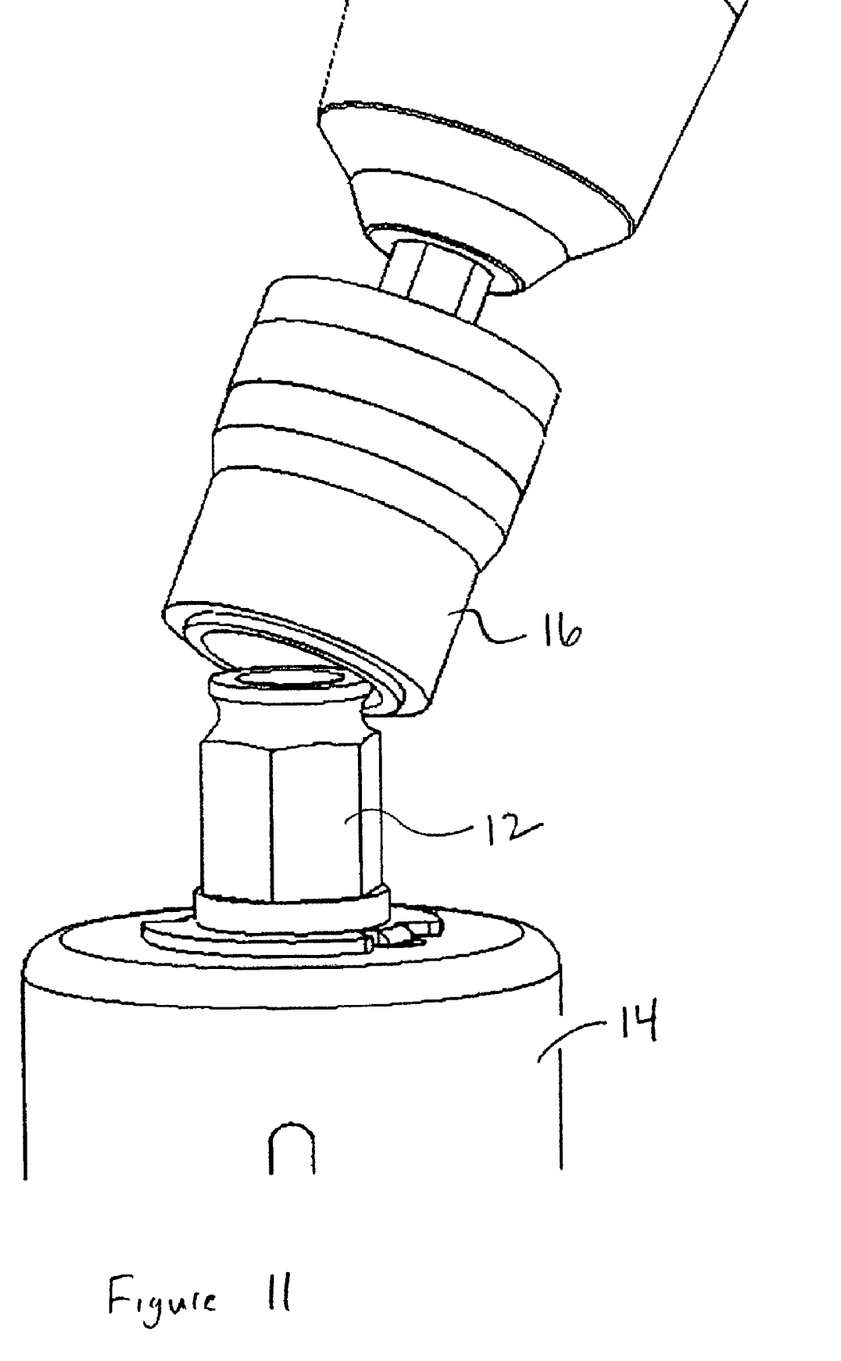
FIG. 11 is an exploded view of a portion of the quick connect system.

Turning to FIG. 9, a perspective view of a set of mandrel and hole saw combinations 119 are shown stored in a container 120 including multiple docking stations 122 (more clearly shown in FIG. 10) along with a drill 124. In order to connect one of the mandrel and hole saw combinations 119 to the drill 124, the user is simply required to snap the drill 124 (having a holder 16 or 70 previously mounted thereon) down over the second end of the mandrel. As the mandrel is assembled with the drill bit, the docking station houses, or erects, the mandrel assembly in a position that permits a wide angle approach of the holder onto the mandrel for direct and easy connection from the docking station. As illustrated in the enlarged FIG. 11, the angling of the hole saw and mandrel combination 119 allows the holder 16 to approach the mandrel at any angle to be quickly connected. As the drill bit is already pre-assembled, this connection process is very quick and easy to use. After use, the hole saw and mandrel combination 119 may simply be placed back into its associated the docking station and then quickly disengaged from the holder and, if necessary, replaced by another hole saw and mandrel combination. As can be seen in FIG. 10, each docking station 122 includes a pole 124 with a central hollowed out portion 126 for receiving the drill bit. As the hole saw and drill bit are typically both very hot after use, the space (as indicated by arrows 125) between pole 124 and the hole saw allows for the hole saw to cool while resting in its docking station 122. The contact between the pole, or post, and the drill bit is at a less hot portion of the drill bit thereby allowing various plastics to be used ion the manufacture of the docking stations. In this embodiment, the cooling is preferably achieved by convection cooling.

In an alternative embodiment, the poles are sized to rest within and contacting the internal surface of the hole saw such that there is no space between the pole and the hole saw. The poles are manufactured from aluminium or similar material which will conduct heat away from hole saw. An advantage of including the storage case as a part of the quick connect system is that the docking stations do not require the user to come in contact with the hand saw and mandrel combination 119 to engage and disengage the mandrel from the holder to avoid the user from burning their hands on the hot saw after operation.

In an alternative embodiment, the docking stations include means for receiving the mandrel and hole saw alone.

Although the above-described embodiments are directed at bi-metal hole saws, it will be understood that a universal quick connect system for carbon hole saws is also contemplated.

Furthermore, the mandrel may be either one or two-piece construction.

In an alternative embodiment, the drill bit may have one or more flats, or ovaloids, to assist in providing the necessary drive to cut a hole. For cutting applications where accuracy is necessary, round to round mating may be used thereby providing multiple support sections between the mandrel and the drill bit to provide further accuracy of concentricity during use. As will understood by one skilled in the art, the manufacture of round to round mating parts is generally more accurate than the manufacture for hexagonal shaped parts.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A mechanism for mounting a hole saw to a tool comprising:
    a hole saw;
    a mandrel having a first end for mounting to said hole saw-and a second end;
    a drill bit, assembled within said mandrel such that when said mandrel is connected to said hole saw, said drill bit being concentrically centered within said hole saw; and
    a holder, mounted to said tool, for receiving said second end of said mandrel;
    a quick connect apparatus for quick release of the mandrel from the holder;
    wherein the quick connect apparatus allows for easy mounting of said mandrel to and releasing of said mandrel from said holder; and
    wherein said mandrel further includes a circumferential locator, located within the mandrel, for locating said mandrel within said holder when connected and securing means for securing said drill bit in place.

2. The mechanism of claim 1 wherein said drill bit is assembled to said mandrel via a set screw.

3. The mechanism of claim 1 further comprising a plate between said mandrel and a bottom surface of the hole saw.

4. The mechanism of claim 3 wherein said plate being slightly larger in diameter than said hole saw.

5. The mechanism of claim 3 wherein said plate is a saw plate.

6. The mechanism of claim 5 wherein said saw plate includes tangs for mating with corresponding notches in said hole saw.

7. A quick connect system comprising:
    a quick connect holder having one end for mounting to the tool;
    a storage case including a plurality of docking stations for housing multiple hole saw and mandrel combinations; said hole saw and mandrel combinations including at least two of the following:
        a hole saw;
        a mandrel having a first end for mounting to said hole saw and a second end for mounting to said quick connect holder; and
        a drill bit, assembled within said mandrel such that when said mandrel is connected to said hole saw, said drill bit being concentrically centered within said hole saw; and
    each of said docking stations including a post for receiving said drill bit to allow for convection cooling for said hole saw and mandrel combination.

8. The mechanism of claim 1 wherein said drill bit is concentrically spaced within said mandrel.

9. The mechanism of claim 1 wherein said securing means is a ball which mates with a groove in said drill bit.

10. The mechanism of claim 1 wherein drill bit is assembled at said first end of said mandrel.

11. The mechanism of claim 1 wherein said holder includes a tool end for mounting to said tool.

12. The mechanism of claim 11 wherein said tool end comprises a hex shaped bit representing an end of a drill bit.

13. The mechanism of claim 1 wherein said tool is a drill.

14. The quick connect system of claim 7 wherein contact between said post and said drill bit occurs at a cooler portion of said drill bit.

15. The quick connect system of claim 7 wherein said docking stations are manufactured from a material which is capable of conducting heat.

16. The quick connect system of claim 7 wherein said docking stations houses said hole saw and mandrel combination permitting easy access of the mandrel when approached by the holder.

17. The mechanism of claim 1 wherein the locator is circular.

* * * * *